Oct. 17, 1944.    R. STEINMANN    2,360,737
ANTIFRICTION JOURNAL BOX
Filed May 20, 1943    2 Sheets-Sheet 1

INVENTOR:
ROBERT STEINMANN
BY Romeyn A. Spare
HIS ATTORNEY.

Oct. 17, 1944.   R. STEINMANN   2,360,737
ANTIFRICTION JOURNAL BOX
Filed May 20, 1943   2 Sheets-Sheet 2

INVENTOR:
ROBERT STEINMANN.
BY Romeyn A. Spare
HIS ATTORNEY.

Patented Oct. 17, 1944

2,360,737

UNITED STATES PATENT OFFICE 2,360,737

ANTIFRICTION JOURNAL BOX

Robert Steinmann, Jersey City, N. J., assignor to General Motors Corporation, Detroit, Mich., a corporation of Delaware Application May 20, 1943, Serial No. 487,679

7 Claims. (Cl. 308—180)

This invention relates to antifriction journal boxes and comprises all of the features of novelty herein disclosed. An object of the invention is to provide bearing spacing means for an axle journal which will insure accurate spacing or alignment of a pair of bearings and yet not interfere with an oiling ring which supplies the bearings with lubricant. Another object is to provide an improved means for mounting a pair of antifriction bearings and an oiling ring in a journal box. Still another object is to provide an improved spacing device for use with an oiling ring in a journal box.

To these ends and also to improve generally upon devices of this character, the invention consists in the various matters hereinafter described and claimed. In its broader aspects, the invention is not necessarily limited to the specific construction selected for illustrative purposes in the accompanying drawings in which Figure 1 is a vertical central section of the journal box.

Figure 2:
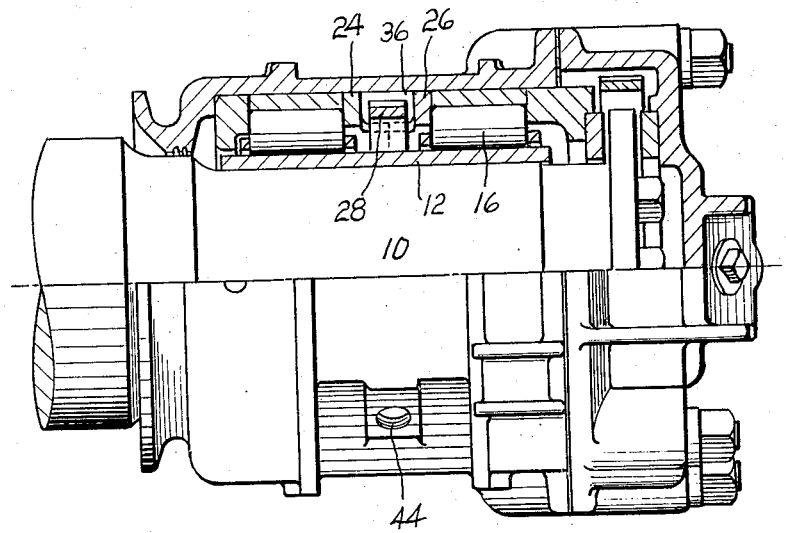
Figure 2 is one half a plan view and one half a horizontal section.
Figure 1:
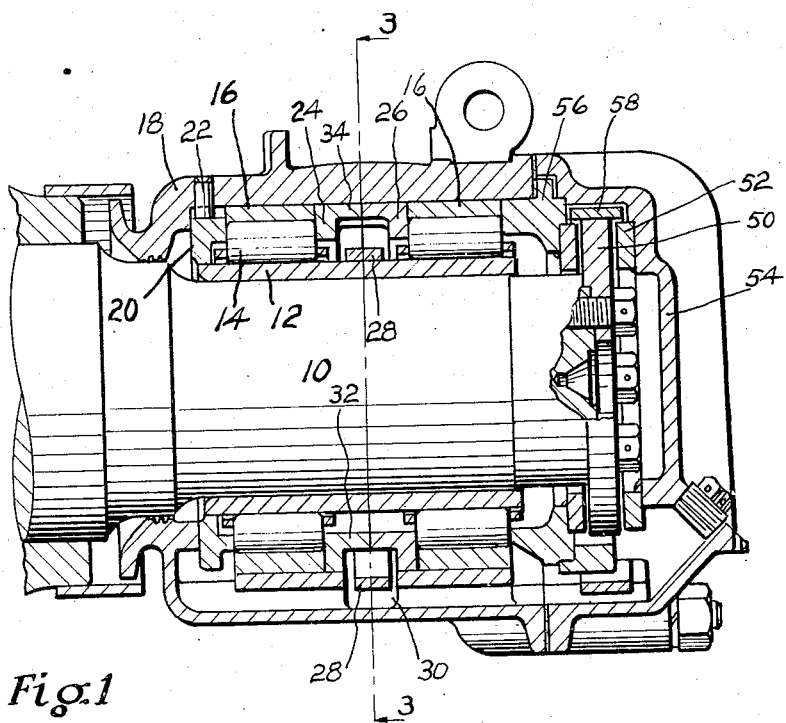
Figure 3:
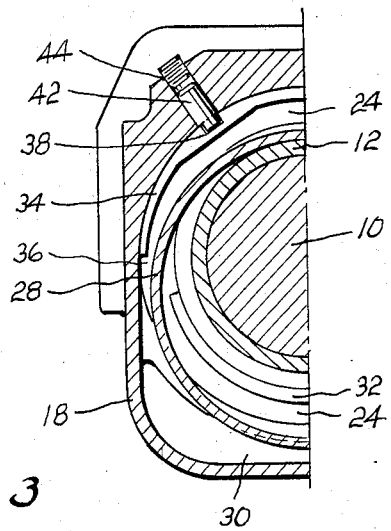
Figure 3 is a sectional view on the line 3—3 of Fig. 1 showing one half of the box.
Figures 4, 5:
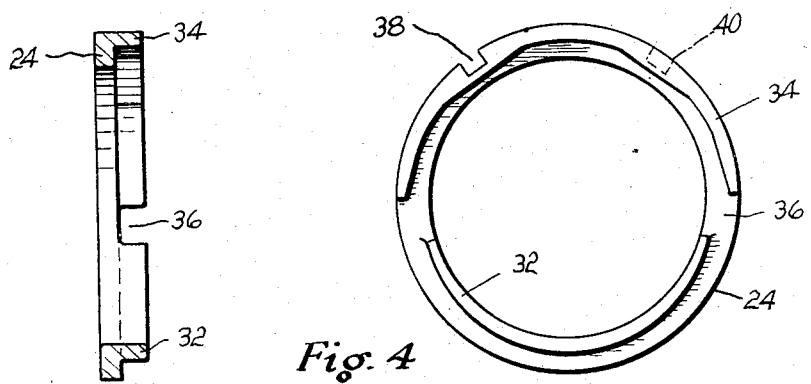
Figure 4 is a side view of one of the spacing rings.
Figure 5 is a vertical central section of the ring of Fig. 4.
Figure 6:
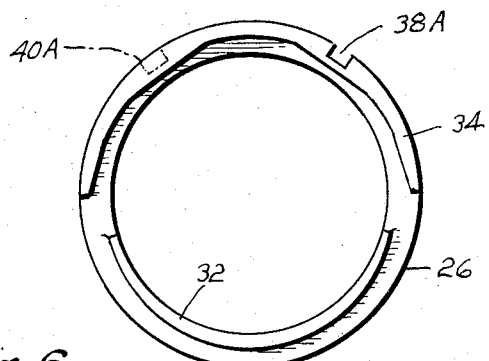
Figure 6 is a side view of the companion spacing ring.

The numeral 10 indicates a shaft or axle journal having a hardened raceway surface which may be integral therewith but it is preferable to have a separate raceway sleeve 12 for two rows of spaced antifriction bearings 14 herein shown as roller bearings having suitable separators which retain the rollers from dropping radially inwards. Each row of rollers runs in an outer race ring 16 seated in a round bearing opening in a housing or journal box 18. Near one end of the box is a ring 20 which guides the adjacent rollers and is held from turning by a key pin 22. Between the outer race rings and spacing them apart are two abutting rings 24 and 26 the body portions of which engage the race rings and guide the rollers. An oiling ring 28 is supported by the journal or by the sleeve 12 in eccentric relation thereto and rotates with the journal to elevate lubricant to the bearings from an oil reservoir 30 at the bottom of the box below the round opening in which the race rings are seated.

The body portion of the spacing ring 24 lies to one side of the oiling ring and has a flange 32 projecting laterally from its inner periphery along the greater portion of its lower half while a flange 34 projects laterally from its outer periphery along the greater portion of its upper half. These flanges mate with and abut uniformly against corresponding flanges on the body portion of the other ring 26. The ends of the flanges 32 are thus closer to the journal than the ends of the flanges 34 so that together they leave nearly vertical side passages or openings 36 for the oiling ring 28 to extend downwardly at each side of the journal. The ring 24 has a notch 38 in the periphery at one side of the vertical center line to receive a key pin 42 which is passed down through a plugged opening 44 in the box. The flange 34 is thickened somewhat in the region where the notch 38 is cut. The other ring has a similar notch 38A at the other side of the center line to receive a portion of the same key pin 42, the rings 24 and 26 being duplicates except that one is a right and one is a left. If desired the ring 24 may have a second notch as indicated in broken lines at 40 and the ring 26 may have a second notch 40A so that the rings will be exact duplicates. Only one key pin 42 will suffice but two may be used if desired. If desired, each race ring 16 may have the adjacent spacing ring made integral therewith.

The bearings and the various rings are assembled from the outer end of the box before the end cap is bolted on. The ring 20 is inserted first. Then the first race ring 16 with its rollers and the spacing ring 24 are pressed in followed by the oiling ring 28 which can be freely inserted axially into the openings or notches 36. The spacing ring 26, the other race ring with its rollers, and the ring 56 follow, the openings or notches in the ring 26 preventing any interference with the rotation of the oiling ring. By means of the abutting flanges 32 and 34, the two spacing rings have a solid abutment against each other around the greater portion of their circumference. Hence, when the outermost race ring 16 is pressed home, it will be definitely located axially in the box without danger of its lower portion being distorted or pressed in too far as would occur in the case of a single wide spacing member inserted between the bearings with the lower half of such member cut away sufficiently to allow the oiling ring to be inserted upwardly from below. As distinguished from such a construction, my invention insures exact spacing and proper location of the race rings in the box.

The remainder of the construction may take various forms but a collar 50 bolted to the axle transmits axle thrust in two directions to adjacent thrust plates 52, one carried by a bolted-on end cap 54 and the other carried by a ring 56 which has a flange projecting into the box to guide the adjacent roller bearings. To lubricate the thrust plates, a second rotary oiling ring 58 is supported on the collar and dips down into the oil in the end cap.

I claim:

1. In a device of the character indicated, a rotary shaft, a housing having an oil reservoir, two rows of rolling elements around the shaft, each row running in an outer race ring inserted in the housing, a rotary oiling ring supported by the shaft in eccentric relation thereto to extend into the oil reservoir, a pair of abutting spacing rings between the race rings, the upper portions of the spacing rings having mating lateral flanges at their outer periphery and the lower portions having mating lateral flanges at their inner periphery, the mating flanges extending towards each other and being in uniform abutting contact throughout substantially the whole circumference of the spacing rings and leaving openings only at the sides for the oiling ring.

2. In a device of the character indicated, a rotary shaft, a housing having an oil reservoir, two rows of rolling elements around the shaft, each row running in a race ring which is supported by the housing, a rotary oiling ring supported by the shaft between the rows, the ring hanging in eccentric relation to the shaft to pass down into the oil reservoir, and means for holding the race rings spaced apart uniformly around substantially their whole circumference while providing for free passage of the oiling ring, said means comprising a pair of spacing rings interposed between the race rings, the spacing rings having mating flanges projecting laterally from their inner peripheries below the shaft and having mating flanges projecting laterally from their outer peripheries above the shaft, the mating flanges below the shaft terminating nearer the shaft than the mating flanges above the shaft to provide vertical passages for the oiling ring at the sides of the shaft.

3. In a device of the character indicated, a rotary shaft, a housing having an oil reservoir, two rows of rolling elements around the shaft, each row running in a race ring which is supported by the housing, a rotary oiling ring supported by the shaft between the rows, the ring hanging in eccentric relation to the shaft to pass down into the oil reservoir, and means for holding the race rings spaced apart uniformly around substantially their whole circumference while providing for free passage of the oiling ring at opposite sides of the shaft, said means comprising a pair of rings having their body portions engaging the adjacent ends of the race rings and having flanges abutting against one another.

4. In a device of the character indicated, a housing having a lubricant reservoir, a shaft journalled for rotation in the housing, a rotary oiling ring supported by the shaft in eccentric relation thereto to extend down into the lubricant reservoir, a pair of rings having body portions fitting in the housing at opposite sides of the oiling ring, the two rings having upper and lower abutting flanges extending laterally towards one another from their body portions, the upper flanges extending around the outside of the upper portion of the oiling ring and the lower flanges extending inside of the lower portion of the oiling ring, and the upper and lower abutting flanges engaging one another throughout substantially the whole circumference of the rings.

5. A spacing device comprising a pair of mating rings, each ring having a circular body portion with upper and lower flanges projecting therefrom to abut against corresponding flanges on the mating ring, each upper flange projecting laterally from the outer periphery of the body portion and extending nearly half way around the ring and each lower flange projecting laterally from the inner periphery of the body portion and extending nearly half way around the ring.

6. In a device of the character indicated, a rotary shaft, a housing having an oil reservoir, a race ring in the housing, rolling elements running in the race ring and surrounding the shaft, a ring engaging the race ring and having upper and lower flanges, the upper flange projecting laterally from the outer periphery and extending nearly half way around the ring and the lower flange projecting laterally from the inner periphery and extending nearly half way around the ring, and an oiling ring supported by the shaft and passing down through the openings left between the ends of the flanges.

7. In a device of the character indicated, a rotary shaft, a housing having a round bearing opening and an oil reservoir below the opening, a pair of axially spaced outer race rings insertable axially into the opening, two spaced rows of rolling elements running in the outer race rings and surrounding the shaft, a circular oiling ring supported by the shaft between the rows and extending down into the reservoir, and a circular spacing device insertable axially into the bearing opening for rigidly spacing the race rings apart uniformly around substantially their whole circumference and constructed to provide for free passage of the oiling ring therethrough at opposite sides of the shaft.

ROBERT STEINMANN.